United States Patent [19]

Nyberg et al.

[11] Patent Number: 4,656,070
[45] Date of Patent: Apr. 7, 1987

[54] COEXTRUDED RECOVERABLE ARTICLES

[75] Inventors: David D. Nyberg, Sunnyvale; Rong J. Chang; Lester T. Toy, both of Fremont, all of Calif.

[73] Assignee: Raychem Corporation, Menlo Park, Calif.

[21] Appl. No.: 805,498

[22] Filed: Dec. 5, 1985

Related U.S. Application Data

[63] Continuation-in-part of Ser. No. 648,116, Sep. 6, 1984, abandoned, and Ser. No. 648,117, Sep. 6, 1984, abandoned.

[51] Int. Cl.$^4$ .......................... F16L 9/14; B32B 31/00
[52] U.S. Cl. ............................... 428/36; 174/DIG. 8; 138/99; 138/141; 156/52; 156/86; 156/244.13; 156/244.24
[58] Field of Search ................. 174/DIG. 8, 845, 885; 138/141, 99; 156/53, 52, 86, 344, 244.13, 244.17, 244.24; 428/36

[56] References Cited

U.S. PATENT DOCUMENTS

| | | | |
|---|---|---|---|
| 4,035,534 | 7/1977 | Nyberg | 428/36 |
| 4,070,746 | 1/1978 | Evans et al. | 174/DIG. 8 |
| 4,135,553 | 1/1979 | Evans et al. | 174/DIG. 8 |
| 4,179,320 | 12/1979 | Midgley et al. | 174/DIG. 8 |
| 4,338,970 | 7/1982 | Krackeler et al. | 174/DIG. 8 |
| 4,523,970 | 6/1985 | Toy | 138/141 |

Primary Examiner—Roland E. Martin
Assistant Examiner—James J. Seidleck
Attorney, Agent, or Firm—Edith A. Rice; Herbert G. Burkard

[57] ABSTRACT

A shrinkable tubular article comprises a tubular inner elastomeric member held in a radially expanded configuration by a tubular outer restraining means. The restraining means is prepared from a blend of a relatively rigid thermoplastic material and a segmented copolymer having at least one segment compatible with the thermoplastic and at least one segment compatible with the elastomer of the inner member. Optionally, the restraining means contains a tackifier. The inner surface of the outer member and the outer surface of the inner member are directly bonded together (i.e. without an interfacial adhesive). The bond between the members is sufficiently strong to restrain the inner elastomer member from shrinking to, or toward, its unexpanded configuration. In addition, the bond weakens sufficiently on application of solvent to permit the elastomeric member to peel away from the restraining outer member. Use of a blend of a thermoplastic and a segmented copolymer and optional tackifier, described above, for the restraining member permits the article to be produced in a continuous manner, e.g. by coextrusion.

55 Claims, 2 Drawing Figures

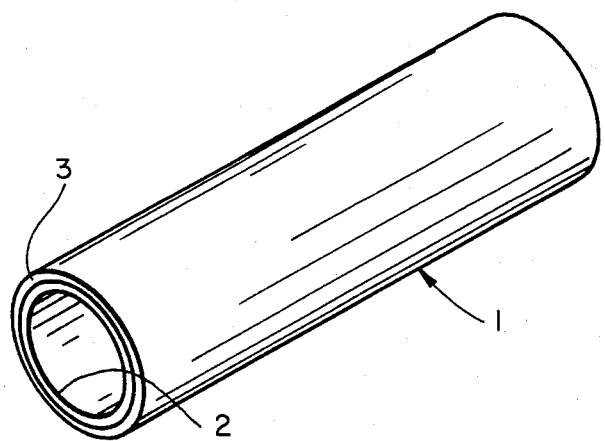
FIG_1
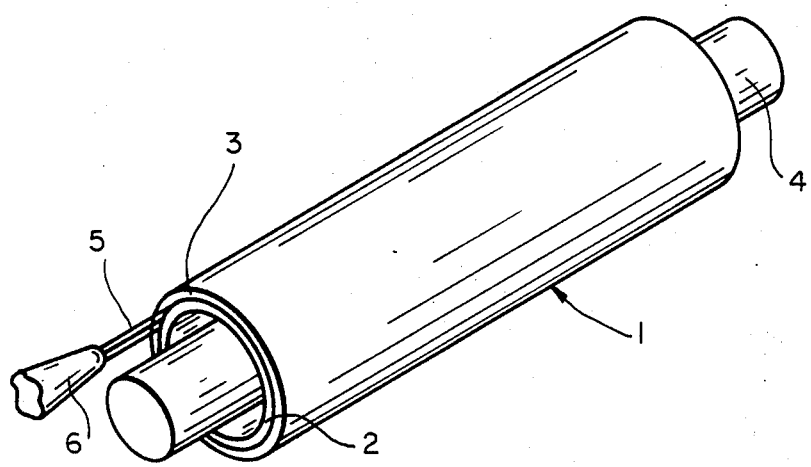
FIG_2

COEXTRUDED RECOVERABLE ARTICLES

REFERENCE TO RELATED APPLICATIONS

This application is a continuation-in-part of application Ser. No. 648,116 filed Sept. 6, 1984 abandoned, and Ser. No. 648,117 filed Sept. 6, 1984 abandoned, the disclosures of which are incorporated herein by reference.

BACKGROUND OF THE INVENTION

1. Field of the Invention

This invention relates to a dimensionally recoverable elastomeric tubular article, a method for producing the article and a method of covering a substrate using the article. In particular, it relates to a dimensionally recoverable elastomeric tubular article comprising a radially expanded elastomeric inner member held in the expanded configuration by a relatively rigid outer restraining means.

2. Background Information

U.S. Pat. Nos. 4,070,746 and 4,135,553 to Evans and Wolfe, 4,179,320 and 4,287,012 to Midgley and Nyberg, and 4,338,970 to Krackeler and Wier, each disclose recoverable articles of the same general type as the articles of this invention. The recoverable article comprises an elastomer member held in an expanded condition by an outer restraining means. The elastomeric member is bonded to the outer restraint. In use, the article is positioned around a substrate to be covered and the elastomer member is released from the restraint. Due to the elastic properties of the expanded elastomeric member, it will then recover (or shrink) toward its unexpanded configuration and into contact with the substrate.

In U.S. Pat. No. 4,135,553, the elastomeric member is released from the restraint by applying a solvent which weakens the adhesive bond between the members. In U.S. Pat. No. 4,179,320, the elastomeric member is released from the restraint by peeling strips of the restraining means from the elastomer member. In U.S. Pat. No. 4,338,970, the elastomeric layer is released by breaking or segmenting the restraint and removing the pieces or segments from the elastomer member thereby allowing it to recover to its unexpanded configuration.

In U.S. Pat. No. 4,135,553 ('553), it is asserted that the bond between the elastomeric member and the restraint may be formed simply by adhesion of the elastomeric member to the restraint. In the practice of the '553 invention, it has been found that such a bond is inadequate to prevent premature recovery of the elastomeric member. The use of an adhesive to provide an adequate bond has been found to be necessary. It has also been found necessary to employ the fabrication procedures disclosed in U.S. Pat. No. 4,135,553. Such procedures involve forming the restraint, coating its inner surface with adhesive, forming the elastomeric member, coating its outer surface with adhesive, cross-linking the elastomer and expanding the elastomeric member into contact with the restraint. An alternate method is to form the elastomeric member and then injection mold the outer restraint around the member. Both these methods are non-continuous procedures in which each article must be manufactured individually.

This invention provides a method for the continuous manufacture of recoverable elastomer articles of this type. Prior attempts to coextrude the elastomeric member and the restraint were unsuccessful. The bond formed either had inadequate strength to restrain the elastomeric member from premature recovery, particularly if stored at temperatures of about 60° C., or would not release the elastomeric member when solvent was applied. It has now been unexpectedly discovered that the incorporation of a segmented copolymer, as defined hereinafter, and optionally a tackifier into a thermoplastic material to be used for the restraint overcomes these problems and enables the continuous manufacture of dimensionally recoverable article of this type.

SUMMARY OF THE INVENTION

One aspect of the present invention, provides a shrinkable tubular article comprising:
(1) a tubular inner member comprising an elastomeric material which is held under tension in a radially expanded configuration; and
(2) a tubular outer restraining means comprising a blend of a relatively rigid thermoplastic polymeric material and a segmented copolymer having at least one segment compatible with the thermoplastic material and at least one segment compatible with the elastomeric material;

the inner surface of the restraining means being directly secured to the outer surface of said inner member by a bond whose peel strength is at least about 2 pounds per linear inch at 21° C., said bond being sufficiently weakened by the application of a solvent to allow the inner member to pull away from the restraining means and to return to or toward its unexpanded configuration.

Another aspect of the present invention, provides a shrinkable tubular article comprising:
(1) a tubular inner member comprising an elastomeric material which is held under tension in a radially expanded configuration; and
(2) a tubular outer restraining means comprising a blend of a relatively rigid thermoplastic polymeric material, a tackifier and a segmented copolymer having at least one segment compatible with the thermoplastic material and at least one segment compatible with the elastomeric material;

the inner surface of the restraining means being directly secured to the outer surface of said inner member by a bond whose peel strength at about 60° C. is at least about 2 pounds per linear inch, said bond being sufficiently weakened by the application of a solvent to allow the inner member to pull away from the restraining means and to return to or toward its unexpanded configuration.

Another aspect of this invention comprises a method of preparing a shrinkable tubular article comprising a tubular inner member comprising an elastomeric material which is held under tension in a radially expanded configuration and a tubular outer restraining means, which method comprises:
(i) preparing a blend of a thermoplastic polymeric material and a segmented copolymer having at least one segment compatible with the thermoplastic material and at least one segment compatible with the elastomeric material;
(ii) coextruding the blend and the elastomeric material to form a tube having the blend as the outer member and the elastomer as the inner member;
(iii) radially expanding the tube to form the shrinkable tubular article.

Optionally (i) can contain a tackifier.

Yet another aspect of this invention comprises a method of covering a substrate which comprises:

(a) positioning over the substrate a shrinkable tubular article comprising
   (1) a tubular inner member comprising an elastomeric material which is held under tension in a radially expanded configuration; and
   (2) a tubular outer restraining means comprising a blend of a relatively rigid thermoplastic polymeric material and segmented copolymer having at least one segment compatible with the thermoplastic material and at least one segment compatible with the elastomeric material; the inner surface of the restraining means being directly secured to the outer surface of said inner member by a bond whose peel strength is at least about 2 pounds per linear inch at 21° C., said bond being sufficiently weakened by the application of a solvent to allow the inner member to pull away from the restraining means and to return to or toward its unexpanded configuration; and
(b) applying a solvent to the bond between the inner and outer members thereby weakening the bond sufficiently to permit the elastomeric member to pull away from the restraint and shrink into contact with said substrate.

Optionally the tubular outer restraining means further comprises a tackifier.

BRIEF DESCRIPTION OF THE DRAWING

The invention is illustrated in the accompanying drawings, in which

FIG. 1 is an isometric view of an article of the invention.

FIG. 2 is an isometric view of an article of the invention placed around a substrate, immediately before the elastomer is released from the restraining means.

DETAILED DESCRIPTION OF THE INVENTION

The tubular inner member of the article of this invention comprises an elastomeric material. The elastomeric material must be capable of being stretched or expanded to an extended condition in the radial direction from which the elastomeric material can recover, i.e. shrink, upon removal of the restraint holding it in the stretched or expanded condition. Virtually any desired material possessing elastomeric recovery properties may be used. The elastomeric material should be one which does not exhibit a substantial permanent set or decrease in recovery on storage. Suitable elastomers include materials such as natural and synthetic polyisoprenes, polybutadiene, styrenebutadiene rubber (SBR), butadiene rubber, polychloroprene (Neoprene), butyl rubber, polysulfide, silicone rubber, urethane rubber, polyacrylate, epichlorohydrin homo and copolymers, propylene oxide rubber, fluorosilicone rubber, fluorocarbon rubber, chlorosulfonated polyethylene, chlorinated polyethylene, ethylene propylene rubber, nitroso rubber and phosphonitrilic rubber. Preferred elastomers are ethylene-propylene-diene monomer rubber (EPDM), polychloroprene (Neoprene) and silicone rubber.

The properties of the elastomeric member or sleeve are to a large extent, dependent upon the intended use of the sleeve. Thus, if the sleeve is to be used primarily as an electrical insulation, its electrical properties will be of primary importance. On the other hand, if the sleeve will be subjected to much physical abuse, it may be necessary to provide a sleeve which has toughness, good flame resistance, good solvent resistance, etc. For high voltage uses, it may be desirable to have a sleeve which has been made semiconductive by dispersing large amounts of suitable fillers or conductive particles in the sleeve or possesses resistance to tracking and/or erosion.

The tubular outer restraining means comprises a blend of a relatively rigid thermoplastic material, a segmented copolymer and optionally a tackifier. Preferably the copolymer is present in an amount of about 2.5 to about 60%, most preferably from about 10 to about 30%, by weight based on the weight of the blend.

The blend of thermoplastic material, segmented copolymer and optional tackifier should have a 2% secant modulus at 21° C. of at least about 4,000 psi, preferably at least about 13,000 psi and preferably does not exceed about 500,000, particularly 200,000. (The 2% secant modulus is measured, at the indicated temperature, by the method of ASTM D638-72 using a 0.5 inch wide straight specimen, a cross-head speed of 0.5 inch per minute, a jaw separation of 5 inch and a chart speed of 20 inch per minute.) This provides a sufficient rigidity that the restraining means formed of the blend will not undergo buckling which will interfere with the use of the article. Further, the blend should have an ultimate elongation at 21° C. and at a separation speed of 200% per minute, which is preferably at least 10%, most preferably at least 35% and preferably does not exceed 120%, particularly 100%. In some embodiments, the elongation may be as high as 300% or even higher. (The ultimate elongation is measured, at the indicated temperature, by the method of ASTM D412-75 using dumb bell specimens (Die D) and 1 inch bench marks, the separation speed being 2 inch per minute for measurement at a separation speed of 200% per minute and 20 inch per minute for measurement at a separation speed of 2,000% per minute.) The blend also should be notch sensitive. Notch sensitivity of the material means that when the material is scored, or notched, for example axially along the length of the restraining means, and then flexed, the restraining means breaks along the score line exposing the underlying elastomeric member. Solvent can then be applied along this line to facilitate release of the elastomeric member.

The relatively rigid thermoplastic material can be, for example, polystyrene, polymethylmethacrylate, polymethyl styrene, nylon and the like. The thermoplastic material is selected on the basis of its mechanical properties. The thermoplastic material selected should have a 2% secant modulus, elongation and notch sensitivity such that when blended with the segmented copolymer the resulting blend will have the desired properties. Further, the relatively rigid thermoplastic material should have a solubility parameter and a critical surface tension higher than that of the elastomeric material selected for the inner member.

Tackifiers which can be used include, for example, rosin, modified rosin, rosin derivatives such as rosin sales or rosin esters, hydrocarbon resins, modified hydrocarbon resins, polymerized petroleum hydrocarbons, polyterpenes, phenolic resins, terpene/phenolic resins, coumarone-indene resins and the like.

To achieve the desired bonding between the restraining means and the elastomeric member, the segmented copolymer used should have at least one segment compatible with the elastomeric material. The copolymer is preferably present in an amount of about 2.5 to about 60%, most preferably from about 10 to about 30%, by weight based on the weight of the blend. In order to obtain a blend of the segmented copolymer and the thermoplastic, the copolymer should have at least one segment compatible with the thermoplastic. Further, the segment compatible with the elastomer should be incompatible with the thermoplastic and the segment compatible with the thermoplastic should be incompatible with the elastomer. The degree of compatibility of polymers can generally be determined by the solubility parameter (Hildebrand) of the polymers. Polymers of similar solubility parameters are generally compatible and those with diverse solubility parameters are generally incompatible. It has been determined that, for the blend used for the restraining means of this invention, the thermoplastic material and the segment of the copolymer compatible with the thermoplastic material should have higher solubilty parameters and critical surface tensions than the elastomeric material and the segment of the copolymer compatible therewith, respectively.

While not wishing to be bound by any theory, it is believed that the segments of the copolymer compatible with the elastomeric material and incompatible with the thermoplastic material, that is segments with the lower solubility parameter and lower critical surface tension, tend to migrate to the surface of the blend, that is to the surface of the restraining means. Since these segments are compatible with the elastomeric material they are generally capable of forming a bond with the elastomeric material. This bond is sufficiently strong to hold the elastomeric material in an expanded condition yet weakens on application of solvent to release the elastomer.

The bond formed between the elastomeric member and the restraining means should have a peel strength of at least about 2 pounds per linear inch (pli), preferably at least about 4 pli, most preferably at least about 8 pli. The bond generally will have a peel strength not greater than about 30 pli but this is not critical. Preferably the peel strength is not more than about 20 pli to permit manual removal of a segment of the restraining means to facilitate application of the solvent to the interface between the elastomeric member and the restraining means during use of the article. The peel strength is measured, at the indicated temperature, by the following procedure. A rectangular specimen free from score lines is cut from the article. With the aid of solvent applied to one end of the specimen, the inner member is separated from the restraining means over a limited distance. After evaporation of the solvent, the separated end of the inner member is placed in one jaw of an Instron Tester and the separated end of the restraining means is placed in the other jaw. The peel strength is determined at a jaw separation speed of 2 inches per minute, taking the average of the highest and lowest values.

The segmented copolymer is a copolymer containing different repeat units grouped together in segments. Such copolymers can be, for example, block or graft copolymers.

A block polymer is a polymer whose molecule is made up of comparatively long segments that are of one monomer, these segments being separated by comparatively long segments of a different monomer. A graft copolymer is obtained by grafting a monomer segment onto a straight chain polymer segment to produce a branched chain copolymer.

As is evident from the above discussion the segmented copolymer used depends on both the thermoplastic material with which it is to be blended and the elastomer to be used. Generally, the elastomer is selected depending on its desired use, for example, what substrate to be covered. After selection of the elastomer the restraining means can be determined. For example, if ethylene-propylene-diene monomer rubber (EPDM) is selected as the elastomer, the relatively rigid thermoplastic should have a solubility parameter higher than the EPDM rubber. In the case of EPDM rubber, which has a solubility parameter of 7.7, polystyrene (homopolymer or high impact grades) having a solubility parameter of about 9.2, provides a suitable choice for the thermoplastic of the restraining means. A segmented copolymer which has a segment compatible with EPDM rubber and a segment compatible with polystyrene is a block copolymer of styrene and butadiene. The styrene-based block (or blocks) is compatible with the polystyrene and incompatible with the EPDM while the butadiene-based block (or blocks) is compatible with the EPDM rubber and incompatible with the polystyrene.

Other examples of typical elastomer/thermoplastic/-segmented copolymer which can be used include: polybutadiene rubber/polystyrene/styrene-butadiene-styrene block copolymer; EPDM rubber/polymethyl methacrylate/graft copolymer of methyl methacrylate grafted on to natural rubber; polybutadiene rubber/-polymethyl methacrylate/graft copolymer of methyl methacrylate grafted onto natural rubber; neoprene rubber/ethylene-vinyl acetate copolymer/segmented block copolyester containing segments of polytetramethylene ether and polytetramethylene terephthalate; and silicone rubber/poly α-methylstyrene/dimethylsiloxane/poly α-methylstyrene segmented block copolymer.

Other segmented block and graft copolymers can be used in appropriate systems. One skilled in the art with the teaching of this specification before him, can, without undue experimentation, determine appropriate blends for use in preparing a restraining means for a selected elastomer.

Optionally, the blend can contain a tackifier. It has been found that the presence of a tackifier improves the bond between the restraining means and the inner elastomeric member at elevated temperatures such as 60° C. for a period of time. Temperatures up to about 60° C. are encountered during typical storage conditions for products of this type. If a tackifier is not included in the blend, the inner elastomeric member tends to delaminate from the restraining means comprised of the blend if the article is maintained at 60° C. for a period of time. The tackifier is preferably present in an amount of about 5 to about 60%, and in particular about 10 to about 25%.

As stated above, the thermoplastic material, tackifier segmented copolymer and optional tackifier should have a 2% secant modulus at 21° C. of at least about 4,000 psi, preferably at least about 13,000 psi. The tackifier, if present, may reduce the modulus of the blend to an undesireably low level. In this event, a second relatively rigid thermoplastic material can be added to the blend to provide the desired modulus. For example, where the thermoplastic material is a polystyrene, the second thermoplastic material can be, for example, polyphenylene oxide, preferably added as a blend of polyphenylene oxide and polystyrene. Other rigid thermoplastics which can be added as the second thermoplastic material included, for example, poly α-methyl styrene and a blend of polycarbonate and a styrene copolymer.

The relatively rigid thermoplastic material, optional tackifier and the segmented copolymer can be admixed by any convenient technique. They can be blended, for example, on a two roll mill, in a Banbury or Brabender internal mixer, in an extruder or the like.

It is an important feature of this invention that the article can be produced in a continuous process. Preferably the article is produced by coextruding the elastomeric material and the thermoplastic blend. The materials are coextruded using a conventional extruder. The resulting tube is then expanded preferably continuously or as discrete articles, if desired.

Following extrusion, the elastomeric material of the article preferably is cross-linked. This can be achieved chemically or by irradiation. Chemical cross-linking is achieved by incorporating a cross-linking agent into the elastomeric material prior to the coextrusion step. Following coextrusion cross-linking is accomplished by heating the coextruded article. Suitable cross-linking agents depend on the particular elastomer selected and are well known to one skilled in the art. Preferably, the elastomeric material is cross-linked by subjecting the article to irradiation, for example, from an electron beam. In this event the blend of the restraining means should be selected so that it is not detrimentally affected by the irradiation. The thermoplastic material of the restraint may also be cross-linked.

Expansion can be accomplished by internal air pressure within the coextruded tube or by passing it over a mandrel of the desired diameter. Since expansion is of both the inner and outer members, the blend forming the restraining means must be capable of expanding to the desired degree. Generally, the coextruded tube is expanded to about twice its original diameter.

The articles of this invention can be used to apply a covering or enclosure of elastomeric material over a substrate. The article is positioned around the substrate and solvent is applied to the interface between the elastomeric material and the restraining means. This typically takes place at ambient temperatures (about 21° C.). The solvent weakens the bond between the elastomer and restraining means permitting the expanded elastomeric member to recover toward its unexpanded state and into contact with the substrate. Preferred substrates are pipes, conduits, cables, particularly cable splices, and the like.

The term solvent is used herein to denote any fluid which will substantially weaken the forces securing the inner member to the restraining means. Solvents which can be used are chlorinated solvents such as chlorinated aliphatic hydrocarbons, for example, chloroform, methylene dichloride, trichloroethylene, or 1,1,1-trichloroethane, aromatic hydrocarbons, for example toluene, ketones, for example, methyl ethyl ketone or acetone and esters.

The elastomeric and thermoplastic materials can contain various additives for example, stabilizers, flame retardants, notch-sensitive improvers, pigments, plasticizers, tackifiers and the like can be present.

The tubular articles of the present invention are generally utilized in the tubular configuration. It is to be understood, however, that after coextrusion, the tubular article may be formed into other configurations, for example into a cap by providing one end of the tube with a seal or by pinching the walls at the end of the tube together. This invention also contemplates articles which are formed into a tubular configuration during use. For example, a coextruded sheet of an elastomer and restraining means, as described herein, may be positioned around a substrate, such as a cable, thereby forming a tubular article. The longitudinal edges can be held together by suitable fastening means and solvent applied to release the elastomer.

The drawing illustrates a typical article in accordance with this invention and its use in covering a substrate. In FIG. 1 an article, 1, in accordance with this invention comprises elastomeric member, 2, which is held in a radially expanded configuration by restraining means, 3. In the illustrated embodiment the elastomeric member, 2, comprises EPDM rubber and the restraining means, 3, is made from a blend of high impact polystyrene and a styrene-butadiene block copolymer. There is no adhesive at the interface between the restraining means, 3, and the elastomeric member, 2.

FIG. 2 illustrates the use of the article of FIG. 1 to cover a substrate. The article, 1, is positioned around the substrate, 4, to be covered by elastomeric member, 2. The elastomeric member, 2, is in a radially expanded configuration, held there by restraining means, 3. A solvent, 5, is being spraying from a container (not shown) through a nozzle, 6, onto the interface between elastomeric member, 2, and the restraining means, 3. As the solvent is applied to the interface, the elastomeric member, 2, will pull away from the restraining means, 3, and shrink into contact with substrate, 4. Restraining means, 3, can then be removed from the substrate and discarded.

The following examples illustrate preparation of typical elastomeric materials and blends suitable for use for the restraining means.

EXAMPLE 1

This example illustrates the preparation of compositions useful for preparing an article of this invention. In this, EPDM is the elastomer and a blend of high impact polystyrene and a styrene-butadiene block copolymer is shown to be useful for the restraining means.

Preparation of the Elastomeric Materials

The following ingredients, in the amounts indicated, were mixed together in a Banbury mixer.

| Ingredient | Amount (parts by weight) |
| --- | --- |
| Ethylene-propylene-5-ethylidene-2-norbornene terpolymer (Vistalon 2504 from Exxon) | 100 |
| Diphenylamine-acetone reaction product | 2 |
| Zinc 2-mercaptobenzotriazole | 3 |
| Red Iron Oxide ($Fe_2O_3$) | 2 |
| Clay | 40 |
| Silane coupling agent (Silane A-172 from Dow Corning) | 1.2 |
| Polyisobutylene | 15 |
| Mineral Oil | 5 |
| Red lead ($Pb_3O_4$) | 3 |
| Trimethanol propane trimethacrylate | 4 |

Preparation of a thermoplastic blend for use in a restraining means

The following ingredients, in the amounts indicated, were blended on an Banbury mixer.

| Ingredient | Amount |
| --- | --- |
| High impact polystyrene (Styron 492U from Dow) | 75 |
| Styrene-butadiene block copolymer (Krayton 1102 from Shell) | 25 |
| Tetrakis [methylene-3-(3',5'-di-tert-butyl-4'-hydroxyphenyl propionate)] methane | 0.1 |
| Mixed ester of thiodipropionate | 0.05 |
| Calcium Carbonate | 50 |
| Red pigment | 2 |

The resulting blend had an ultimate elongation at 21° C. of 40% and a 2% secant modulus of 53,000 psi.

For evaluation for use in preparing an article of this invention, 6"×6" slabs of the materials (75 mils thick) were prepared. A slab of the elastomeric material and a slab of the thermoplastic blend were superimposed and placed between two steel plates, each coated with polytetrafluoroethylene (PTFE). The samples were pressed at 300° F., at 1000 psi for 3 minutes and 5000 psi for 30 seconds. The samples were cooled in a cold press for 2 minutes at 10,000 psi. The samples were irradiated using an electron beam with a dosage of 20 megarads on each side.

The peel strength of the bond between the slabs was 8 pli (measured by ASTMD-3167). On application of solvent to the interface between the slabs, the bond was sufficiently weakened to permit ready separation of the slabs. These results indicate that the materials are suitable for preparing a tubular article of this invention using the above elastomeric material as the inner member and the thermoplastic blend as the outer restraining means.

EXAMPLE 2

The procedures of Example 1 were repeated using a slightly different elastomeric material with the same thermoplastic blend.

The elastomeric material used was:

| Ingredient | Amount |
| --- | --- |
| Polybutadiene | 100 |
| Ethylene-propylene-5-ethylidene-2-norbornene terpolymer (Vistalon 2504 from Exxon) | 100 |
| Diphenylamine acetone | 2 |
| Zinc 2-mercaptobenzotriazole | 3 |
| Red Iron Oxide (Fe$_2$O$_3$) | 2 |
| Clay | 40 |
| Silane coupling agent (Silane A-172 from Dow Corning) | 1.2 |
| Polyisobutylene | 15 |
| Mineral Oil | 5 |
| Red lead (Pb$_3$O$_4$) | 3 |
| Trimethanol propane trimethacrylate | 4 |

EXAMPLE 3

The procedures of Example 1 were repeated using the following materials.

Elastomeric material—the elastomeric material of Example 1 (EPDM rubber).

Thermoplastic blend:

| Ingredient | Amount (Parts by weight) |
| --- | --- |
| Polymethyl methacrylate (VM-100 from Rohm and Haas) | 50 |
| Graft copolymer of polymethyl methacrylate on natural rubber (Haveaplus MG-30 from Natural Rubber Producers Research Association) | 50 |
| Tetrakis [methylene-3-(3',5'-di-tert-butyl-4'-hydroxyphenyl propionate)] methane | 0.1 |
| Mixed ester of thiodipropionate | 0.05 |

The bond between the slabs was releasable on application of either 1,1,1-trichloroethane or toluene. The bond had a peel strength of 2.11 pli.

EXAMPLE 4

Example 3 was repeated using the elastomeric material of Example 2 (polybutadiene) and the polymethylmethacrylate/graft copolymer blend of Example 3.

The bond between the slabs was releasable on application of 1,1,1-trichloroethane and toluene. The peel strength of the bond was 3.55 pli.

EXAMPLE 5

The procedures of Example 1 were repeated using silicone rubber (Silastic GP-45 available from Dow Corning) as the elastomeric material.

The thermoplastic blend used contained a mixture of the following ingredients, in the amounts specified.

| Ingredients | Amount (Parts by weight) |
| --- | --- |
| Polydimethyl siloxane/poly α-methylstyrene segmented block copolymer (X9-6318 from Dow Corning) | 75 |
| Poly α-methylstyrene (18-290 from Amoco) | 25 |

The peel strength of the bond between the slabs is 14. The bond was releasable on application of acetone, methyl ethyl ketone, toluene and 1,1,1-trichloroethane.

EXAMPLE 6

This example illustrates the preparation of compositions useful for preparing an article of this invention. In this, EPDM is the elastomer and a blend of high impact polystyrene, a hydrocarbon resin tackifier, a styrene/ethylene/butylene segmented block copolymer and a second thermoplastic material comprising a blend of polyphenylene oxide and polystyrene is shown to be useful for the restraining means.

Preparation of the Elastomeric Materials

The following ingredients, in the amounts indicated, were mixed together in a Banbury mixer.

| Ingredient | Amount (parts by weight) |
| --- | --- |
| Ethylene-propyleneo 5-ethylidene-2-norbornene terpolymer (Vistalon 6505 from Exxon) | 100 |
| Diphenylamine acetone | 2 |
| Zinc 2-mercaptobenzotriazole | 3 |

-continued

| Ingredient | Amount (parts by weight) |
|---|---|
| Red Iron Oxide (Fe$_2$O$_3$) | 2 |
| Clay | 40 |
| Silane coupling agent (Silane A-172 from Dow Corning) | 1.2 |
| Polyisobutylene | 15 |
| Mineral Oil | 5 |
| Red lead (Pb$_3$O$_4$) | 3 |
| Trimethanol propane trimethacrylate | 4 |

Preparation of a thermoplastic blend for use in a restraining means

| Ingredient | Composition A Amount | Composition B Amount |
|---|---|---|
| High impact polystyrene (Styron 492U from Dow) | 75 | 62.5 |
| Styrene-ethylene-butylene block copolymer (Krayton 1650 from Shell) | 33.3 | 45 |
| Hydrocarbon Resin Tackifier (Escorez 5320 from Exxon) | 33.3 | 45 |
| Blend of Polyphenylene Oxide and Polystyrene (Noryl EN625 from General Electric) | 25 | 37.5 |
| Tetrakis [methylene-3-(3',5'-di-tert-butyl-4'0 hydroxyphenyl propionate)] methane | 0.66 | 0.66 |
| Lauryl thiodipropionate | 0.33 | 0.33 |
| Calcium Carbonate | 66.5 | 66.5 |
| Red pigment | 2.66 | 2.66 |
| 2% Secant Modulus in psi | | |
| at 21° C. | 7.5 × 10$^4$ | 1.8 × 10$^4$ |
| at 60° C. | 4.0 × 10$^4$ | 1.2 × 10$^4$ |

For evaluation for use in preparing an article of this invention, 6"×6" slabs of the materials (25 mils thick) were prepared. A slab of the elastomeric material and a slab of the thermoplastic blend were superimposed and placed between two steel plates, each coated with polytetrafluoroethylene (PTFE). The samples were pressed at 300° F., at 1000 psi for 3 minutes and 5000 psi for 30 seconds. The samples were cooled in a cold press for 2 minutes at 10,000 psi. The samples were irradiated using an electron beam with a dosage of 20 megarads on each side.

The peel strength of the bond between the slabs was measured by ASTM D-3167. The results are as follows:

| Peel Strength in pli (ASTM-3167) | A | B |
|---|---|---|
| at 21° C. | 6.8 | 8.5 |
| at 60° C. | 4.5 | 5.6 |

On application of solvent to the interface between the slabs, the bond was sufficiently weakened to permit ready separation of the slabs. These results indicate that the materials are suitable for preparing a tubular article of this invention using the above elastomeric material as the inner member and the thermoplastic blend as the outer restraining means.

EXAMPLE 7

(Comparative Example)

The procedures of Example 6 were repeated using the same elastomeric material with a blend of a thermoplastic and a segmented copolymer which does not contain a tackifier.

The thermoplastic blend was prepared by mixing the following ingredients, in the amounts (parts by weight) indicated, on a Banbury mixer.

| Ingredient | Composition A Amount |
|---|---|
| High impact polystyrene (Styron 492U from Dow) | 100 |
| Styrene-ethylene-butylene block copolymer (Krayton 1650 from Shell) | 33.3 |
| Tetrakis [methylene-3-(3',5'-di-tert-butyl-4'-hydroxyphenyl propionate)] methane | 0.66 |
| Lauryl thiodipropionate | 0.33 |
| Calcium Carbonate | 66.5 |
| Red pigment | 2.66 |
| 2% Secant Modulus in psi | |
| at 21° C. | 8.3 × 10$^4$ |
| at 60° C. | 5.8 × 10$^4$ |

For evaluation for use in preparing an article of this invention, 6"×6" slabs of the materials (25 mils thick) were prepared. A slab of the elastomeric material and a slab of the thermoplastic blend were superimposed and placed between two steel plates, each coated with polytetrafluoroethylene (PTFE). The samples were pressed at 300° C., at 1000 psi for 3 minutes and 5000 psi for 30 seconds. The samples were cooled in a cold press for 2 minutes at 10,000 psi. The samples were irradiated using an electron beam with a dosage of 20 megarads on each side.

The peel strength of the bond between the slabs was measured by ASTM D-3167. The results are as follows:

| Peel Strength in pli (ASTM-3167) | A |
|---|---|
| at 21° C. | 3.75 |
| at 60° C. | 1.0 |

The low peel strength at 60° C. indicates this blend would not be suitable for use where storage at 60° C. was required.

On application of solvent to the interface between the slabs, the bond was sufficiently weakened to permit ready separation of the slabs. These results indicate that the materials are suitable for preparing a tubular article of this invention using the above elastomeric material as the inner member and the thermoplastic blend as the outer restraining means, providing storage at 60° C. was not required.

While the invention has been described herein in accordance with certain preferred embodiments thereof, many modifications and changes will be apparent to those skilled in the art. Accordingly, it is intended by the appended claims to cover all such modifications and changes as fall within the true spirit and scope of the invention.

I claim:

1. A shrinkable tubular article comprising:
   (1) a tubular inner member comprising an elastomeric material which is held under tension in a radially expanded configuration; and (2) a tubular outer restraining means comprising a blend of a relatively rigid thermoplastic material and a segmented copolymer having at least one segment compatible with the thermoplastic material and at least one segment compatible with the elastomeric material;

the inner surface of the restraining means being directly secured to the outer surface of said inner member by a bond whose peel strength is at least about 2 pounds per linear inch at 21° C., said bond being sufficiently weakenable by the application of a solvent to allow the inner member to pull away from the restraining means and to return to or toward its unexpanded configuration.

2. An article in accordance with claim 1 wherein the peel strength of the bond between the inner and outer members is at least 4 pounds per linear inch at 21° C.

3. An article in accordance with claim 1 wherein the peel strength of the bond between the inner and outer members is at least 8 pounds per linear inch at 21° C.

4. An article in accordance with claim 1 wherein the thermoplastic material has a higher solubility parameter than the elastomeric material.

5. An article in accordance with claim 4 wherein the segment of the segmented copolymer compatible with the thermoplastic material has a higher solubility parameter than the segment compatible with the elastomeric material.

6. An article in accordance with claim 1 wherein said blend has a 2% secant modulus at 21° C. of at least about 4,000 psi.

7. An article in accordance with claim 6 wherein said secant modulus is at least about 4,000 psi.

8. An article in accordance with claim 1 wherein said block has an ultimate elongation at 21° C. of 25%.

9. An article in accordance with claim 1 wherein said segmented copolymer is a block copolymer.

10. An article in accordance with claim 1 wherein said segmented copolymer is a graft copolymer.

11. An article in accordance with claim 1 wherein said elastomeric material is an ethylene-propylene-diene monomer rubber or polybutadiene.

12. An article in accordance with claim 10 wherein said restraining means comprises a blend of polymethyl methacrylic and a graft copolymer of methyl methacrylate grafted onto natural rubber.

13. An article in accordance with claim 10 wherein said restraining means comprises a blend of styrene and a block copolymer of butadiene and styrene.

14. An article in accordance with claim 1 wherein said elastomer is silicone rubber.

15. An article in accordance with claim 13 wherein said restraining means comprises a blend of poly α-methyl styrene and a block copolymer of polydimethyl siloxane and poly α-methylstyrene.

16. A method of preparing a shrinkable tubular article comprising a tubular inner member comprising an elastomeric material which is held under tension in a radially expanded configuration and a tubular outer restraining means, which method comprises:

(i) preparing a blend of a thermoplastic polymeric material and a segmented copolymer having at least one segment compatible with the thermoplastic material and at least one segment compatible with the elastomeric material;

(ii) coextruding the blend and the elastomeric material to form a tube having the blend as the outer member and the elastomer as the inner member;

(iii) radially expanding the tube to form the shrinkable tubular article.

17. A method in accordance with claim 16 which further comprises the step of cross-linking the elastomer prior to expansion.

18. A method in accordance with claim 17 wherein the elastomer is cross-linked by irradiation.

19. A method in accordance with claim 17 wherein the step of cross-linking also cross-links the thermoplastic material.

20. A method in accordance with claim 16 wherein the coextruded tube is radially expanded using internal gas pressure.

21. A method in accordance with claim 16 wherein the coextruded tube is radially expanded to about twice its original diameter.

22. A method in accordance with claim 16 wherein said elastomeric material is an ethylene-propylene-diene monomer rubber.

23. A method in accordance with claim 16 wherein said restraining means comprises a blend of styrene and a block copolymer of butadiene and styrene.

24. A method in accordance with claim 16 wherein said restraining means comprises a blend of polymethyl methacrylate and a graft copolymer of methyl methacrylate grafted onto natural rubber.

25. A method in accordance with claim 16 wherein said elastomer is silicone rubber.

26. A method in accordance with claim 16 wherein said restraining means comprises a blend of poly α-methyl styrene and a block copolymer of polydimethyl siloxane and poly α-methyl styrene.

27. A method of covering a substrate which comprises:

(a) positioning over the substrate a shrinkable tubular article comprising
  (1) a tubular inner member comprising an elastomeric material which is held under tension in a radially expanded configuration; and
  (2) a tubular outer restraining means comprising a blend of a relatively rigid thermoplastic polymeric material and segmented copolymer having at least one segment compatible with the thermoplastic material and at least one segment compatible with the elastomeric material;
  the inner surface of the restraining means being directly secured to the outer surface of said inner member by a bond whose peel strength is at least about 2 pounds per linear inch at 21° C., said bond being sufficiently weakened by the application of a solvent to allow the inner member to pull away from the restraining means and to return to or toward its unexpanded configuration; and (b) applying a solvent to the bond between the inner and outer members thereby weakening the bond sufficiently to permit the elastomeric member to pull away from the restraint and shrink into contact with said substrate.

28. A method in accordance with claim 26 wherein the substrate to be covered is a cable splice.

29. A method in accordance with claim 26 wherein said elastomeric material is an ethylene-propylene-diene monomer rubber or butadiene.

30. A method in accordance with claim 28 wherein said restraining means comprises a blend of styrene and a block copolymer of butadiene and styrene.

31. A method in accordance with claim 28 wherein said restraining means comprises a blend of polymethyl methacrylate and a graft copolymer of methyl methacrylate grafted onto natural rubber.

32. A method in accordance with claim 26 wherein said elastomer is silicone rubber.

33. A method in accordance with claim 31 wherein said restraining means comprises a blend of poly α-methyl styrene and a block copolymer of polydimethyl siloxane and poly α-methyl styrene.

34. A method in accordance with claim 22 wherein said solvent is selected from the group consisting of chlorinated aliphatic hydrocarbons, aromatic hydrocarbons, ketones and esters.

35. A shrinkable tubular article comprising:
   (1) a tubular inner member comprising an elastomeric material which is held under tension in a radially expanded configuration; and
   (2) a tubular outer restraining means comprising a blend of: (a) a relatively rigid thermoplastic material; (b) a tackifier; and (c) a segmented copolymer having at least one segment compatible with the thermoplastic material and at least one segment compatible with the elastomeric material;
   the inner surface of the restraining means being directly secured to the outer surface of said inner member by a bond whose peel strength at about 60° C. is at least about 2 pounds per linear inch, said bond being sufficiently weakenable by the application of a solvent to allow the inner member to pull away from the restraining means and to return to or toward its unexpanded configuration.

36. An article in accordance with claim 35 wherein the peel strength of the bond between the inner and outer members is at least 4 pounds per linear inch at about 60° C.

37. An article in accordance with claim 35, wherein the thermoplastic material has a higher solubility parameter than the elastomeric material.

38. An article in accordance with claim 37, wherein the segment of the segmented copolymer compatible with the thermoplastic material has a higher solubility parameter than the segment compatible with the elastomeric material.

39. An article in accordance with claim 35, wherein said blend has a 2% secant modulus at 21° C. of at least about 4,000 psi.

40. An article in accordance with claim 35, wherein said secant modulus is at least about 13,000 psi.

41. An article in accordance with claim 35, wherein said elastomeric material is an ethylene-propylene-diene monomer rubber or polybutadiene.

42. An article in accordance with claim 35, wherein said restraining means comprises a blend of polystyrene, a hydrocarbon resin tackifier, and a block copolymer of styrene, ethylene and butylene.

43. An article in accordance with claim 42, wherein said blend further comprises polyphenylene oxide.

44. An method of preparing a shrinkable tubular article comprising a tubular inner member comprising an elastomeric material which is held under tension in a radially expanded configuration and a tubular outer restraining means, which method comprises:
   (i) preparing a blend of (a) a thermoplastic polymeric material; (b) a tackifier; and (c) a segmented copolymer having at least one segment compatible with the thermoplastic material and at least one segment compatible with the elastomeric material;
   (ii) coextruding the blend and the elastomeric material to form a tube having the blend as the outer member and the elastomer as the inner member;
   (iii) radially expanding the tube to form the shrinkable tubular article.

45. A method in accordance with claim 44 which further comprises the step of cross-linking the elastomer prior to expansion.

46. A method in accordance with claim 45 wherein the elastomer is cross-linked by irradiation.

47. A method in accordance with claim 45 wherein the step of cross-linking also cross-links the thermoplastic material.

48. A method in accordance with claim 44 wherein the coextruded tube is radially expanded using internal gas pressure.

49. A method in accordance with claim 44, wherein the coextruded tube is radially expanded to about twice its original diameter.

50. A method in accordance with claim 44, wherein said elastomeric material is an ethylene-propylene-diene monomer rubber.

51. A method in accordance with claim 44, wherein said restrining means comprises a blend of polystyrene, a hydrocarbon resin tackifier, and a block copolymer of styrene, ethylene and butylene.

52. A method of covering a substrate which comprises:
   (a) positioning over the substrate a shrinkable tubular article comprising
      (1) a tubular inner member comprising an elastomeric material which is held under tension in a radially expanded configuration; and
      (2) a tubular outer restraining means comprising a blend of (a) a relatively rigid thermoplastic polymeric material; (b) a tackifier; and (c) segmented copolymer having at least one segment compatible with the thermoplastic material and at least one segment compatible with the elastomeric material;
      the inner surface of the restraining means being directly secured to the outer surface of said inner member by a bond whose peel strength after ten days at about 60° C. is at least about 2 pounds per linear inch measured at about 60° C., said bond being sufficiently weakened by the application of a solvent to allow the inner member to pull away from the restraining means and to return to or toward its unexpanded configuration; and
   (b) applying a solvent to the bond between the inner and outer members thereby weakening the bond sufficiently to permit the elastomeric member to pull away from the restraint and shrink into contact with said substrate.

53. A method in accordance with claim 52, wherein the substrate to be covered is a cable splice.

54. A method in accordance with claim 52, wherein said elastomeric material is an ethylene-propylene-diene monomer rubber or butadiene.

55. A method in accordance with claim 52, wherein said restraining means comprises a blend of polystyrene, a hydrocarbon resin tackifier, and a block copolymer of styrene, ethylene and butylene.

* * * * *